United States Patent
Oh et al.

(10) Patent No.: US 12,195,590 B2
(45) Date of Patent: Jan. 14, 2025

(54) POLYAMIDE-BASED FILM, METHOD OF PREPARING POLYAMIDE-BASED FILM, COVER WINDOW AND DISPLAY DEVICE COMPRISING THE SAME

(71) Applicant: SK microworks Co., Ltd., Gyeonggi-do (KR)

(72) Inventors: Dae Seong Oh, Gyeonggi-do (KR); Han Jun Kim, Gyeonggi-do (KR); Sun Hwan Kim, Gyeonggi-do (KR); Heung Sik Kim, Gyeonggi-do (KR); Jin Woo Lee, Gyeonggi-do (KR)

(73) Assignee: SK MICROWORKS CO., LTD., Gyeonggi-do (KR)

( * ) Notice: Subject to any disclaimer, the term of this patent is extended or adjusted under 35 U.S.C. 154(b) by 0 days.

(21) Appl. No.: 17/729,674

(22) Filed: Apr. 26, 2022

(65) Prior Publication Data

US 2022/0403104 A1 Dec. 22, 2022

(30) Foreign Application Priority Data

May 20, 2021 (KR) ........................ 10-2021-0065077

(51) Int. Cl.
*C08G 69/32* (2006.01)
*B32B 7/12* (2006.01)
(Continued)

(52) U.S. Cl.
CPC ................ *C08G 69/32* (2013.01); *B32B 7/12* (2013.01); *B32B 27/06* (2013.01); *B32B 27/34* (2013.01);
(Continued)

(58) Field of Classification Search
None
See application file for complete search history.

(56) References Cited

U.S. PATENT DOCUMENTS

2004/0266920 A1* 12/2004 Studholme ................ D01F 1/04
524/495
2017/0190880 A1 7/2017 Jo et al.
(Continued)

FOREIGN PATENT DOCUMENTS

| CN | 110325568 A | * 10/2019 | ........... B29C 39/006 |
| CN | 111161634 A | 5/2020 | |

(Continued)

OTHER PUBLICATIONS

Office Action for the Korean Patent Application No. 10-2021-0065077 issued by the Korean Intellectual Property Office on Sep. 30, 2022.
(Continued)

*Primary Examiner* — Tamra L. Dicus
(74) *Attorney, Agent, or Firm* — IP & T GROUP LLP

(57) ABSTRACT

The embodiments provide a polyamide-based film, which comprises a polyamide-based polymer and has a light resistance index of 0.660 GPa-1 or less as represented by the following Equation 1, whereby it has excellent mechanical properties, optical properties, and light resistance. [Equation 1] Light resistance index=$\Delta$YI/Y. In Equation 1, Y is the modulus of the film, and $\Delta$YI is the rate of change in yellow index (YI) of the film before and after a light resistance test in which UV rays are irradiated to the film at 60° C., the UV irradiation is stopped, and water is sprayed at 50° C.

8 Claims, 3 Drawing Sheets

(51) Int. Cl.
*B32B 27/06* (2006.01)
*B32B 27/34* (2006.01)
*C08K 5/00* (2006.01)
*C08K 5/3475* (2006.01)

(52) U.S. Cl.
CPC .......... C08K 5/0041 (2013.01); C08K 5/3475 (2013.01); *B32B 2307/414* (2013.01); *B32B 2307/54* (2013.01); *B32B 2457/20* (2013.01)

(56) References Cited

U.S. PATENT DOCUMENTS

| | | | |
|---|---|---|---|
| 2020/0024401 A1 | 1/2020 | Ryu et al. | |
| 2020/0407501 A1 | 12/2020 | Ryu et al. | |
| 2020/0407520 A1 | 12/2020 | Oh et al. | |
| 2020/0407522 A1* | 12/2020 | Choi | G02B 1/00 |
| 2020/0407556 A1 | 12/2020 | Ki et al. | |
| 2020/0409413 A1 | 12/2020 | Kim et al. | |
| 2021/0002425 A1 | 1/2021 | Ryu et al. | |
| 2021/0222007 A1 | 7/2021 | Choi et al. | |
| 2021/0230449 A1* | 7/2021 | Park | H10K 59/871 |
| 2021/0341971 A1* | 11/2021 | Park | G02B 1/14 |
| 2022/0315702 A1* | 10/2022 | Park | C08G 73/1039 |

FOREIGN PATENT DOCUMENTS

| | | | | |
|---|---|---|---|---|
| JP | 2016108482 A | 6/2016 | | |
| JP | 2021-503023 A | 2/2021 | | |
| KR | 10-2017-0080532 A | 7/2017 | | |
| KR | 10-2018-0131378 A | 12/2018 | | |
| KR | 102147342 B1 * | 8/2020 | | |
| WO | WO-2017200042 A1 * | 11/2017 | ............. | B32B 27/08 |
| WO | 2020/159085 A1 | 6/2020 | | |

OTHER PUBLICATIONS

Office Action on the Japanese Patent Application No. 2022-077822 issued by the Japanese Patent Office on Jun. 20, 2023.
Extended European Search Report for the European Patent Application No. 22174487.3 issued by the European Patent Office on Oct. 17, 2022.
Office Action for Chinese Patent Application No. 202210563394.6 issued by the Chinese Patent Office on Jul. 12, 2024.

* cited by examiner

A – A'

POLYAMIDE-BASED FILM, METHOD OF PREPARING POLYAMIDE-BASED FILM, COVER WINDOW AND DISPLAY DEVICE COMPRISING THE SAME

CROSS-REFERENCE TO RELATED APPLICATION(S)

This application claims benefit of priority to Korean Patent Application No. 10-2021-0065077 filed on May 20, 2021 in the Korean Intellectual Property Office, the disclosure of which is incorporated herein by reference in its entirety.

TECHNICAL FIELD

Embodiments relate to a polyamide-based film, to a process for preparing the same, and to a cover window and a display device comprising the same.

BACKGROUND ART

Polyamide-based polymers are excellent in resistance to friction, heat, and chemicals. Thus, they are employed in such applications as primary electrical insulation, coatings, adhesives, resins for extrusion, heat-resistant paintings, heat-resistant boards, heat-resistant adhesives, heat-resistant fibers, and heat-resistant films.

Polyamide is used in various fields. For example, polyamide is made in the form of a powder and used as a coating for a metal or a magnetic wire. It is mixed with other additives depending on the application thereof. In addition, polyamide is used together with a fluoropolymer as a painter for decoration and corrosion prevention. It also plays a role of bonding a fluoropolymer to a metal substrate. In addition, polyamide is used to coat kitchenware, used as a membrane for gas separation by virtue of its heat resistance and chemical resistance, and used in natural gas wells for filtration of such contaminants as carbon dioxide, hydrogen sulfide, and impurities.

In recent years, polyamide has been developed in the form of a film, which is less expensive and has excellent optical, mechanical, and thermal characteristics. Such a polyamide-based film may be applied to display materials for organic light-emitting diodes (OLEDs) or liquid crystal displays (LCDs), and the like, and to antireflection films, compensation films, and retardation films if retardation properties are implemented.

As the use of such a polyamide-based film is expanded indoors and outdoors, the demand for a polyamide-based film with enhanced mechanical/optical properties and durability is continuously increasing.

DETAILED DESCRIPTION OF THE INVENTION

Technical Problem

An object of the embodiments is to provide a polyamide-based film that is excellent in mechanical properties and optical properties, and a cover window and a display device comprising the same.

Another object of the embodiments is to provide a process for preparing a polyamide-based film that is excellent in mechanical properties and optical properties.

Solution to the Problem

An embodiment provides a polyamide-based film, which comprises a polyamide-based polymer and has a light resistance index of 0.660 GPa$^{-1}$ or less as represented by the following Equation 1.

$$\text{Light resistance index} = \Delta YI/Y \quad \text{[Equation 1]}$$

In Equation 1, Y is the modulus of the film, and $\Delta YI$ is the rate of change in yellow index (YI) of the film before and after a light resistance test in which UV rays are irradiated to the film at 60° C., the UV irradiation is stopped, and water is sprayed at 50° C.

Another embodiment provides a process for preparing a polyamide-based film, which comprises polymerizing a diamine compound and a dicarbonyl compound in an organic solvent to prepare a solution comprising a polyamide-based polymer; casting the solution to prepare a gel sheet; and thermally treating the gel sheet.

Still another embodiment provides a cover window for a display device, which comprises a polyamide-based film and a functional layer, wherein the polyamide-based film has a light resistance index of 0.660 GPa$^{-1}$ or less as represented by the above Equation 1.

An embodiment provides a display device, which comprises a display unit; and a cover window disposed on the display unit, wherein the cover window comprises a polyamide-based film and a functional layer, and the polyamide-based film has a light resistance index of 0.660 GPa$^{-1}$ or less as represented by the above Equation 1.

Advantageous Effects of the Invention

As the polyamide-based film according to the embodiment has a light resistance index within a predetermined range, its flexibility and optical properties are excellent, and its color change due to ultraviolet rays can be effectively suppressed.

BEST MODE FOR CARRYING OUT THE INVENTION

Figure 1:
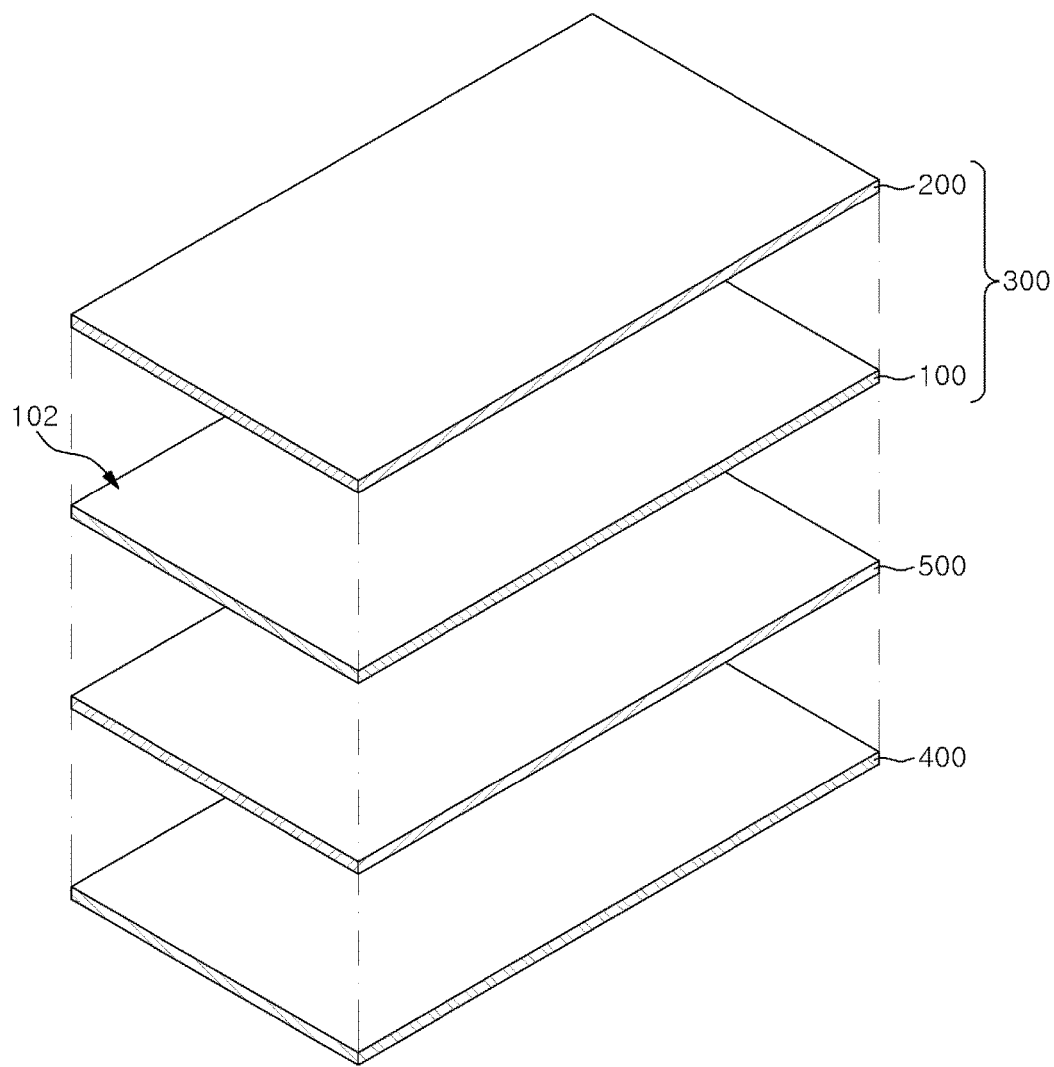
FIG. 1 is a schematic exploded view of a display device according to an embodiment.

Hereinafter, the embodiments will be described in detail with reference to the accompanying drawings so that those skilled in the art to which the present invention pertains may easily practice them. However, the embodiments may be implemented in many different ways and are not limited to those described herein.

Throughout the present specification, in the case where each film, window, panel, layer, or the like is mentioned to be formed "on" or "under" another film, window, panel, layer, or the like, it means not only that one element is directly formed on or under another element, but also that one element is indirectly formed on or under another element with other element(s) interposed between them. In addition, the term on or under with respect to each element may be referenced to the drawings. For the sake of description, the sizes of individual elements in the appended drawings may be exaggeratedly depicted and do not indicate the actual sizes. In addition, the same reference numerals refer to the same elements throughout the specification.

Throughout the present specification, when a part is referred to as "comprising" an element, it is understood that other elements may be comprised, rather than other elements are excluded, unless specifically stated otherwise.

In the present specification, a singular expression is interpreted to cover a singular or plural number that is interpreted in context unless otherwise specified.

In addition, all numbers and expressions related to the quantities of components, reaction conditions, and the like used herein are to be understood as being modified by the term "about," unless otherwise indicated.

The terms first, second, and the like are used herein to describe various elements, and the elements should not be limited by the terms. The terms are used only for the purpose of distinguishing one element from another.

In addition, the term "substituted" as used herein means to be substituted with at least one substituent group selected from the group consisting of deuterium, —F, —Cl, —Br, —I, a hydroxyl group, a cyano group, a nitro group, an amino group, an amidino group, a hydrazine group, a hydrazone group, an ester group, a ketone group, a carboxyl group, a substituted or unsubstituted alkyl group, a substituted or unsubstituted alkenyl group, a substituted or unsubstituted alkynyl group, a substituted or unsubstituted alkoxy group, a substituted or unsubstituted alicyclic organic group, a substituted or unsubstituted heterocyclic group, a substituted or unsubstituted aryl group, and a substituted or unsubstituted heteroaryl group. The substituent groups enumerated above may be connected to each other to form a ring.

Polyamide-Based Film

An embodiment provides a polyamide-based film that is excellent not only in mechanical properties such as modulus, but also in optical properties in terms of high transmittance, low haze, and low yellow index, in which the deterioration of its optical properties is effectively suppressed when it is exposed to UV rays.

The polyamide-based film according to an embodiment comprises a polyamide-base polymer.

The polyamide-based film has a light resistance index of 0.660 $GPa^{-1}$ or less.

$$\text{Light resistance index} = \Delta YI/Y \quad \text{[Equation 1]}$$

In Equation 1, Y is the modulus of the film, and $\Delta YI$ is the rate of change in yellow index (YI) of the film before and after a light resistance test in which UV rays are irradiated to the film at 60° C., the UV irradiation is stopped, and water is sprayed at 50° C.

In some embodiments, the light resistance test may be carried out by repeating the test cycle comprising the ultraviolet irradiation and the water spraying 10 times or more. For example, the test cycle may be carried out 12 times or more.

When the ultraviolet rays are irradiated, the ultraviolet rays may be UVA (Ultraviolet A) and may comprise, for example, electromagnetic waves of 10 to 400 nm. Preferably, the ultraviolet rays may be near ultraviolet rays having a wavelength of 300 to 400 nm. In some embodiments, the ultraviolet rays may have an intensity of 0.2 to 1 $W/m^2$, preferably, 0.2 to 0.8 $W/m^2$, 0.2 to 0.7 $W/m^2$, 0.4 to 1 $W/m^2$, 0.4 to 0.8 $W/m^2$, 0.4 to 0.7 $W/m^2$, 0.6 to 1 $W/m^2$, 0.6 to 0.8 $W/m^2$, or 0.4 to 0.6 $W/m^2$.

For example, the ultraviolet irradiation and the water spraying may be carried out for 1 to 10 hours, respectively. For example, they may be carried out for 2 to 8 hours or 3 to 6 hours, respectively. In some embodiments, the ultraviolet irradiation and the water spraying may be carried out for the same time period.

As the polyamide-based film according to an embodiment satisfies the light resistance index, optical properties such as transmittance and haze and mechanical properties such as modulus can be maintained to be excellent even after the severe light resistance test as described above, and a change in yellow index and color index according to the CIE Lab color coordinates can be effectively suppressed.

In some embodiments, the light resistance index may be 0.630 $GPa^{-1}$ or less, 0.620 $GPa^{-1}$ or less, 0.600 $GPa^{-1}$ or less, 0.550 $GPa^{-1}$ or less, 0.540 $GPa^{-1}$ or less, 0.500 $GPa^{-1}$ or less, 0.450 $GPa^{-1}$ or less, or 0.410 $GPa^{-1}$ or less. In such a case, the film may have excellent modulus, light transmittance, haze, and the like, and the rate of change in yellow index and the color difference before and after the light resistance test may be reduced. In some embodiments, the light resistance index may be 0.100 $GPa^{-1}$ or more, 0.150 $GPa^{-1}$ or more, or 0.200 $GPa^{-1}$ or more.

In some embodiments, the difference ($\Delta YI$) between the yellow index (YI) after the light resistance test and the yellow index before the test may be 4.5 or less. Preferably, $\Delta YI$ may be 3.9 or less, 3.8 or less, 3.5 or less, 3.0 or less, or 2.5 or less.

In some embodiments, the polyamide-based film may have a light resistance color change index of 1.55 to 1.64 as represented by the following Equation 2. In such a case, there may be provided a polyamide-based film having excellent modulus, transmittance, and haze while a deterioration in optical properties due to UV exposure is suppressed.

$$\text{Light resistance color change index} = \Delta YI/\Delta E \quad \text{[Equation 2]}$$

In Equation 2, $\Delta E$ is the color difference of the film before and after the light resistance test. The color difference may be defined by the following Equation 3 in the CIE Lab color coordinates.

$$\Delta E = \sqrt{(L^* - L^*_0)^2 + (a^* - a^*_0)^2 + (b^* - b^*_0)^2} \quad \text{[Equation 3]}$$

In Equation 3, $L^*$, $a^*$, and $b^*$ are L, a, and b values according to the CIE Lab color coordinates after the light resistance test, respectively, and $L^*_0$, $a^*_0$, and $b^*_0$ are L, a, and b values according to the CIE Lab color coordinates before the light resistance test, respectively.

In some embodiments, the color difference ($\Delta E$) before and after the light resistance test may be 2.6 or less. Preferably, $\Delta E$ may be 2.4 or less, 2.3 or less, 2.0 or less, or 1.6 or less.

The polyamide-based film according to an embodiment may have an x-direction refractive index ($n_x$) of 1.60 to 1.70, 1.61 to 1.69, 1.62 to 1.68, 1.64 to 1.68, 1.64 to 1.66, or 1.64 to 1.65.

In addition, the polyamide-based film may have a y-direction refractive index ($n_y$) of 1.60 to 1.70, 1.61 to 1.69, 1.62 to 1.68, 1.63 to 1.68, 1.63 to 1.66, or 1.63 to 1.64.

Further, the polyamide-based film may have a z-direction refractive index ($n_z$) of 1.50 to 1.60, 1.51 to 1.59, 1.52 to 1.58, 1.53 to 1.58, 1.54 to 1.58, or 1.54 to 1.56.

If the x-direction refractive index, the y-direction refractive index, and the z-direction refractive index of the polyamide-based film are within the above ranges, when the film is applied to a display device, its visibility is excellent not only from the front but also from a lateral side, so that a wide angle of view can be achieved.

The polyamide-based film according to an embodiment may have an in-plane retardation ($R_o$) of 800 nm or less. Specifically, the in-plane retardation ($R_o$) of the polyamide-based film may be 700 nm or less, 600 nm or less, 550 nm or less, 100 nm to 800 nm, 200 nm to 800 nm, 200 nm to 700 nm, 300 nm to 700 nm, 300 nm to 600 nm, or 300 nm to 540 nm.

In addition, the polyamide-based film according to an embodiment may have a thickness direction retardation ($R_{th}$) of 5,000 nm or less. Specifically, the thickness direction retardation ($R_{th}$) of the polyamide-based film may be 4,800 nm or less, 4,700 nm or less, 4,650 nm or less, 1,000 nm to 5,000 nm, 1,500 nm to 5,000 nm, 2,000 nm to 5,000 nm, 2,500 nm to 5,000 nm, 3,000 nm to 5,000 nm, 3,500 nm to 5,000 nm, 4,000 nm to 5,000 nm, 3,000 nm to 4,800 nm, 3,000 nm to 4,700 nm, 4,000 nm to 4,700 nm, or 4,200 nm to 4,650 nm.

Here, the in-plane retardation ($R_o$) is a parameter defined by a product ($\Delta n_{xy} \times d$) of anisotropy ($\Delta n_{xy} = |n_x - n_y|$) of refractive indices of two mutually perpendicular axes on a film and the film thickness (d), which is a measure of the degree of optical isotropy and anisotropy.

In addition, the thickness direction retardation ($R_{th}$) is a parameter defined by a product of an average of the two birefringences $\Delta n_{xz}$ ($=|n_x - n_z|$) and $\Delta n_{yz}$ ($=|n_y - n_z|$) observed on a cross-section in the film thickness direction and the film thickness (d).

If the in-plane retardation and the thickness direction retardation of the polyamide-based film are within the above ranges, when the film is applied to a display device, it is possible to minimize the optical distortion and color distortion and to minimize the light leakage from a lateral side as well.

The polyamide-based film may comprise a filler in addition to the polyamide-base polymer.

The filler may comprise, for example, an oxide, a carbonate, or a sulfate of metal or metalloid. For example, the filler may comprise silica, calcium carbonate, barium sulfate, or the like, but it is not limited thereto.

The filler may be employed in the form of particles. In addition, the surface of the filler is not subjected to special coating treatment, and it may be uniformly dispersed in the entire film.

As the polyamide-based film comprises the filler, the film can secure a wide angle of view without a deterioration in the optical properties.

The filler may have a refractive index of 1.55 to 1.75. Specifically, the refractive index of the filler may be 1.60 to 1.75, 1.60 to 1.70, 1.60 to 1.68, or 1.62 to 1.65, but it is not limited thereto.

If the refractive index of the filler satisfies the above range, the birefringence values related to $n_x$, $n_y$, and $n_z$ can be appropriately adjusted, and the luminance of the film at various angles can be improved.

On the other hand, if the refractive index of the filler is outside the above range, there may arise a problem in that the filler is visually noticeable on the film or that the haze is increased due to the filler.

The content of the filler may be 100 ppm to 3,000 ppm based on the total weight of the solids content of the polyamide-based polymer. Specifically, the content of the filler may be 100 ppm to 2,500 ppm, 100 ppm to 2,200 ppm, 200 ppm to 2,500 ppm, 200 ppm to 2,200 ppm, 250 ppm to 2,100 ppm, or 300 ppm to 2,000 ppm, based on the total weight of the solids content of the polyamide-based polymer, but it is not limited thereto.

If the content of the filler is outside the above range, the haze of the film is steeply increased, and the filler may aggregate with each other on the surface of the film, so that a feeling of foreign matter may be visually observed, or it may cause a trouble in the sliding performance or deteriorate the windability in the preparation process.

The content of residual solvents in the polyamide-based film may be 1,500 ppm or less. For example, the content of residual solvents may be 1,200 ppm or less, 1,000 ppm or less, 800 ppm or less, or 500 ppm or less, but it is not limited thereto.

The residual solvent refers to a solvent that has not been volatilized during the film production and remains in the film finally produced.

If the content of the residual solvents in the polyamide-based film exceeds the above range, the durability of the film may be deteriorated, and it may have an impact on the luminance.

When the polyamide-based film according to an embodiment based on a thickness of 50 μm is folded to have a radius of curvature of 3 mm, the number of folding before the fracture may be 200,000 or more.

The number of folding counts one when the film is folded to have a radius of curvature of 3 mm and then unfolded.

As the number of folding of the polyamide-based film satisfies the above range, it can be advantageously applied to a foldable display device or a flexible display device.

The polyamide-based film according to an embodiment may have a surface roughness of 0.01 μm to 0.07 μm. Specifically, the surface roughness may be 0.01 μm to 0.07 μm or 0.01 μm to 0.06 μm, but it is not limited thereto.

As the surface roughness of the polyamide-based film satisfies the above range, it may be advantageous for achieving high luminance even when the angle from the normal direction of a surface light source is increased.

The polyamide-based film comprises a polyamide-base polymer. The polyamide-based polymer may comprise an amide repeat unit. In some embodiments, the polyamide-based polymer may optionally comprise an imide repeat unit.

The polyamide-based polymer may be prepared by simultaneously or sequentially reacting reactants that comprise a diamine compound and a dicarbonyl compound. Specifically, the polyamide-based polymer may be prepared by polymerizing a diamine compound and a dicarbonyl compound.

Alternatively, the polyamide-based polymer is prepared by polymerizing a diamine compound, a dianhydride compound, and a dicarbonyl compound. Here, the polyamide-based polymer may comprise an imide repeat unit derived from the polymerization of the diamine compound and the dianhydride compound and an amide repeat unit derived from the polymerization of the diamine compound and the dicarbonyl compound.

The diamine compound is a compound that forms an imide bond with the dianhydride compound and forms an amide bond with the dicarbonyl compound, to thereby form a copolymer.

The diamine compound is not particularly limited, but it may be, for example, an aromatic diamine compound that contains an aromatic structure. For example, the diamine compound may be a compound represented by the following Formula 1.

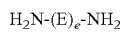 [Formula 1]

In Formula 1, E may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

e is selected from integers of 1 to 5. When e is 2 or more, the Es may be the same as, or different from, each other.

(E)$_e$ in Formula 1 may be selected from the groups represented by the following Formulae 1-1a to 1-14a, but it is not limited thereto.

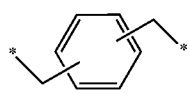

1-1a

1-2a

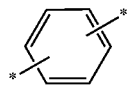

1-3a

1-4a

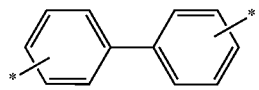

1-5a

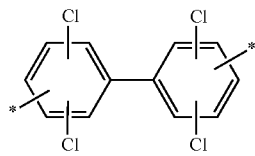

1-6a

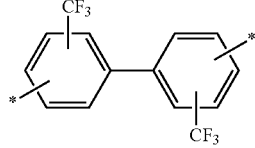

1-7a

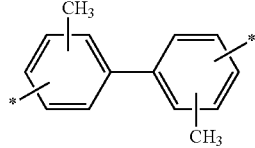

1-8a

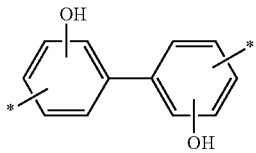

1-9a

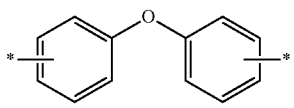

1-10a

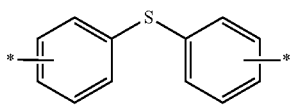

1-11a

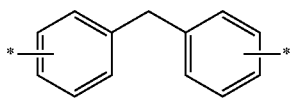

1-12a

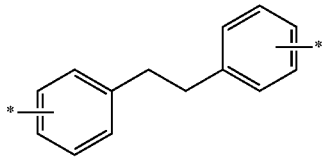

1-13a

*—(CH$_2$)$_n$—*

1-14a (n is selected from integers of 1 to 12)

Specifically, (E)$_e$ in Formula 1 may be selected from the groups represented by the following Formulae 1-1b to 1-13b, but it is not limited thereto.

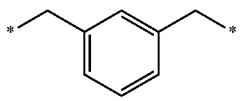

1-1b

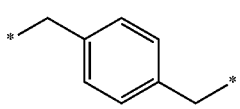

1-2b

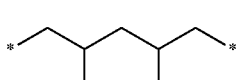

1-3b

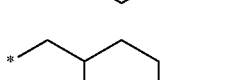

1-4b

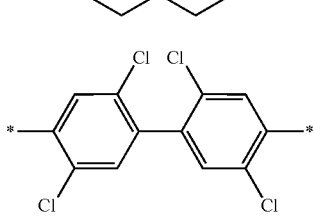

1-5b

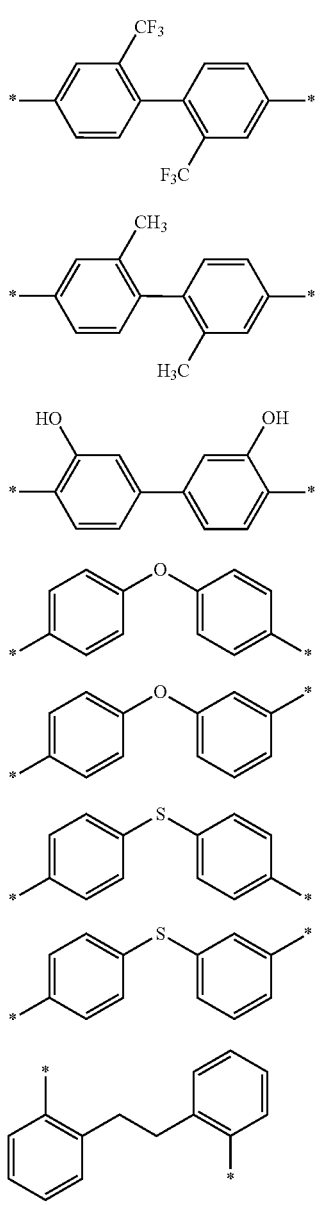

More specifically, (E)$_e$ in Formula 1 may be the group represented by the above Formula 1-6b or the group represented by the above Formula 1-9b.

In an embodiment, the diamine compound may comprise a compound having a fluorine-containing substituent or a compound having an ether group (—O—).

The diamine compound may be composed of a compound having a fluorine-containing substituent. In such an event, the fluorine-containing substituent may be a fluorinated hydrocarbon group and specifically may be a trifluoromethyl group. But it is not limited thereto.

In some embodiments, the diamine compound may comprise one kind of diamine compound. That is, the diamine compound may be composed of a single component.

For example, the diamine compound may comprise 2,2'-bis(trifluoromethyl)-4,4'-diaminobiphenyl (TFDB) represented by the following formula, but it is not limited thereto.

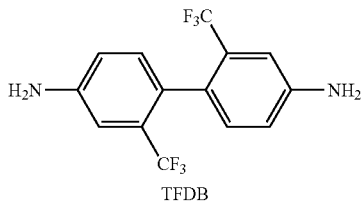

TFDB

The dicarbonyl compound is not particularly limited, but it may be, for example, a compound represented by the following Formula 3.

[Formula 3]

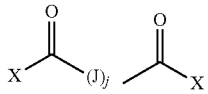

In Formula 3, J may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

j is selected from integers of 1 to 5. When j is 2 or more, the Js may be the same as, or different from, each other.

X is a halogen atom. Specifically, X may be F, Cl, Br, I, or the like. More specifically, X may be Cl, but it is not limited thereto.

(J)$_j$ in the above Formula 3 may be selected from the groups represented by the following Formulae 3-1a to 3-14a, but it is not limited thereto.

3-1a

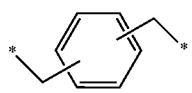

3-2a

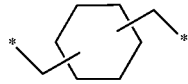

3-3a

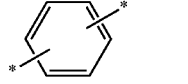

3-4a

3-5a

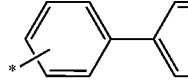

-continued

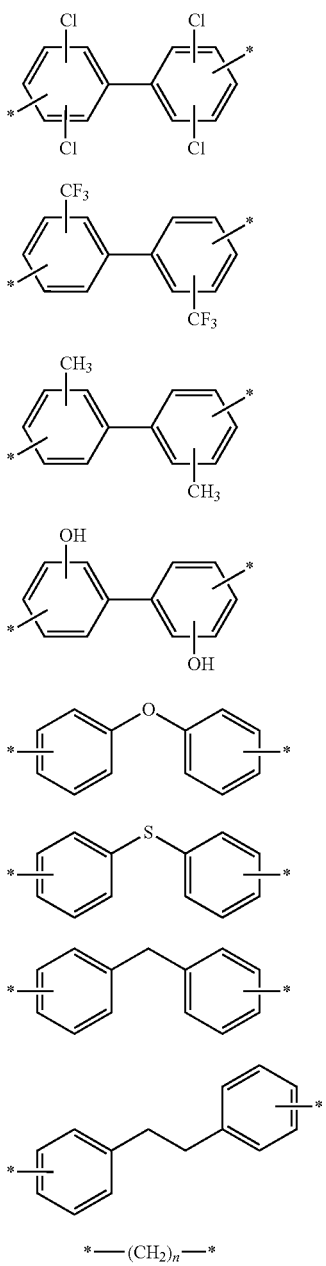

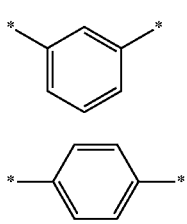

(n is selected from integers of 1 to 12)

Specifically, $(J)_j$ in the above Formula 3 may be selected from the groups represented by the following Formulae 3-1b to 3-8b, but it is not limited thereto.

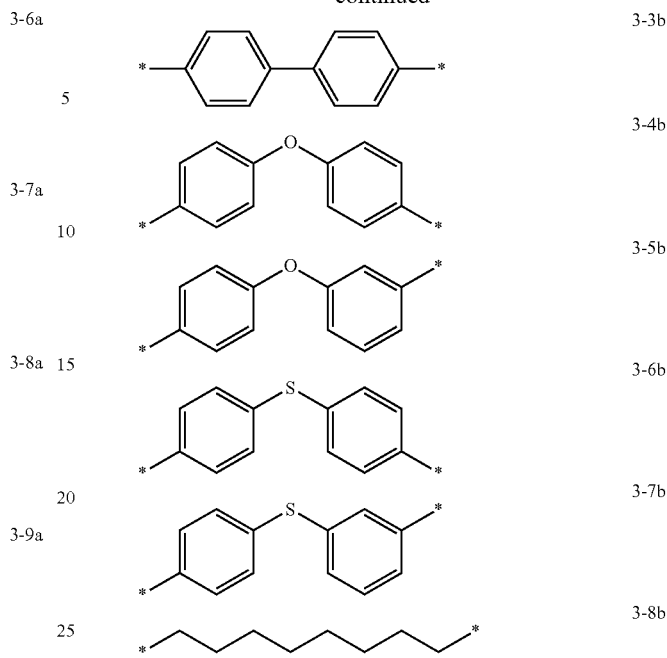

More specifically, $(J)_j$ in Formula 3 may be the group represented by the above Formula 3-1b, the group represented by the above Formula 3-2b, the group represented by the above Formula 3-3b, or the group represented by the above Formula 3-8b.

In an embodiment, the dicarbonyl compound may comprise a mixture of at least two kinds of dicarbonyl compounds different from each other. If two or more dicarbonyl compounds are used, at least two dicarbonyl compounds in which $(J)_j$ in the above Formula 3 is selected from the groups represented by the above Formulae 3-1b to 3-8b may be used as the dicarbonyl compound.

In another embodiment, the dicarbonyl compound may be an aromatic dicarbonyl compound that contains an aromatic structure.

The dicarbonyl compound may comprise terephthaloyl chloride (TPC), 1,1'-biphenyl-4,4'-dicarbonyl dichloride (BPDC), isophthaloyl chloride (IPC), as represented by the following formulae, or a combination thereof. But it is not limited thereto. Preferably, TPC and IPC may be used together.

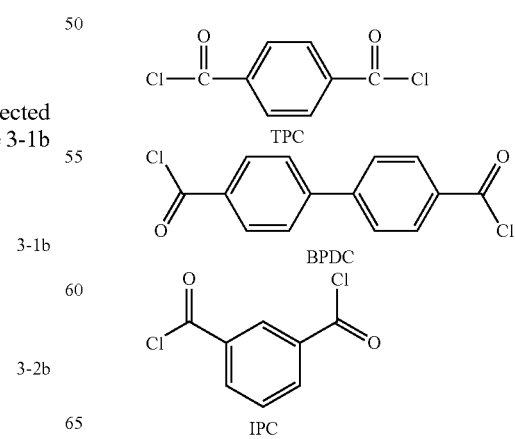

In an embodiment, the polyamide-based polymer may comprise two or more types of an amide-based repeat unit.

For example, the two or more types of an amide-based repeat unit may comprise a first amide-based repeat unit and a second amide-based repeat unit. The first amide-based repeat unit may be formed by reacting a first dicarbonyl compound with the diamine compound. The second amide-based repeat unit may be formed by reacting a second dicarbonyl compound with the diamine compound.

The first dicarbonyl compound and the second dicarbonyl compound may be compounds different from each other.

The first dicarbonyl compound and the second dicarbonyl compound may comprise two carbonyl groups, respectively. The angle between the two carbonyl groups contained in the first dicarbonyl compound may be greater than the angle between the two carbonyl groups contained in the second dicarbonyl compound.

In some embodiments, the first dicarbonyl compound and the second dicarbonyl compound may be structural isomers to each other. As two kinds of dicarbonyl compounds in a structural isomeric relationship are used, a polyamide-based polymer and a film satisfying Equation 1 and/or Equation 2 above can be formed, thereby enhancing the optical properties and mechanical properties of the polyamide-based film.

The first dicarbonyl compound and the second dicarbonyl compound may be an aromatic dicarbonyl compound, respectively. In some embodiments, the first dicarbonyl compound and the second dicarbonyl compound may each have one benzene ring (a phenyl group).

For example, the first dicarbonyl compound and the second dicarbonyl compound may be aromatic dicarbonyl compounds different from each other, but they are not limited thereto.

If the first dicarbonyl compound and the second dicarbonyl compound are an aromatic dicarbonyl compound, respectively, they comprise a benzene ring. Thus, they can contribute to improvements in the mechanical properties such as surface hardness and tensile strength of a film that comprises the polyamide-based polymer thus produced.

For example, the angle between the two carbonyl groups contained in the first dicarbonyl compound may be 160 to 180°, and the angle between the two carbonyl groups contained in the second dicarbonyl compound may be 80 to 140°.

For example, the dicarbonyl compound may comprise a first dicarbonyl compound and/or a second dicarbonyl compound.

For example, the first dicarbonyl compound may comprise TPC, and the second dicarbonyl compound may comprise IPC, but they are not limited thereto.

If TPC is used as the first dicarbonyl compound and IPC is used as the second dicarbonyl compound in a proper combination, a film that comprises the polyamide-based resin thus produced may have high light transmittance, low haze, high transparency, and high modulus with enhanced light resistance.

The diamine compound and the dicarbonyl compound may be polymerized to form a repeat unit represented by the following Formula B.

[Formula B]

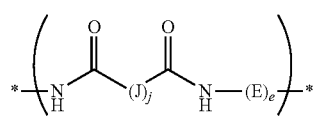

In Formula B, E, J, e, and j are as described above.

For example, the diamine compound and the dicarbonyl compound may be polymerized to form amide repeat units represented by the following Formulae B-1 and B-2.

[Formula B-1]

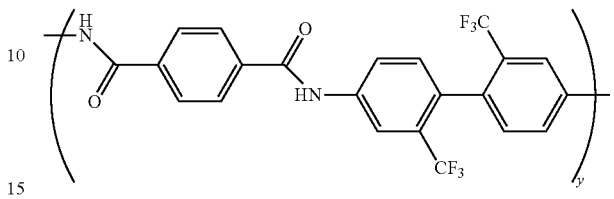

In Formula B-1, y is an integer of 1 to 400.

[Formula B-2]

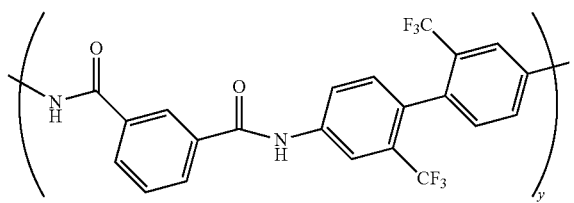

In Formula B-2, y is an integer of 1 to 400.

In some embodiments, the molar ratio of the first amide-based repeat unit to the second amide-based repeat unit may be 21:79 to 79:21. As the molar ratio of the first and second amide-based repeat units is set to the above range, the light resistance index and/or light resistance color change index of the polyamide-based film may be adjusted to ranges satisfying Equations 1 and 2 above. Thus, the mechanical and optical properties and the light resistance of the polyamide-based film may be improved. Preferably, the molar ratio of the first amide-based repeat unit to the second amide-based repeat unit may be 25:75 to 75:25, 30:70 to 75:25, 30:70 to 70:30, 35:65 to 75:25, or 40:60 to 75:25.

The dianhydride compound is not particularly limited, but it may comprise a cyclic dianhydride compound. For example, the dianhydride compound may reduce the birefringence characteristics of the polyamide-based resin and enhance such optical properties as transmittance of the polyamide-based film.

In some embodiments, the cyclic dianhydride compound may comprise an alicyclic dianhydride compound or an aromatic dianhydride compound.

The alicyclic dianhydride compound may comprise a compound in which two anhydride groups are substituted in the alicyclic ring structure. The alicyclic ring structure may contain 4 to 12 carbons and may be fully saturated or partially unsaturated. Specifically, the alicyclic dianhydride compound may comprise, for example, 1,2,3,4-cyclobutanetetracarboxylic dianhydride (CBDA).

The aromatic dianhydride compound may comprise a compound in which two anhydride groups are substituted in an aromatic ring having 6 to 30 carbon atoms. The aromatic ring may comprise benzene, a fused ring such as naphthalene, or a linked ring such as biphenyl. For example, the aromatic dianhydride compound may comprise, for example, 3,3',4,4'-biphenyltetracarboxylic dianhydride (BPDA).

The two anhydride groups in the dianhydride compound may be directly substituted to the cyclic hydrocarbon group or may be substituted at positions symmetrical to each other in the alicyclic ring or the aromatic ring. In such a case, the hardness and restoring force to indentation of the polyamide-based film may be enhanced.

In an embodiment, the dianhydride compound may not comprise a fluorine-containing substituent. For example, when the dianhydride compound contains a fluorine group, the plastic component of the film may be excessively increased; thus, its flexibility and restoring force to indentation may be reduced.

For example, the dianhydride compound may comprise a compound represented by the following Formula 2.

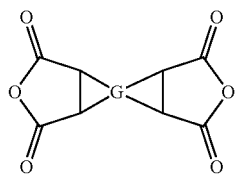

[Formula 2]

In Formula 2, G is a substituted or unsubstituted tetravalent $C_4$-$C_{12}$ aliphatic cyclic group, a substituted or unsubstituted tetravalent $C_4$-$C_{12}$ heteroaliphatic cyclic group, a substituted or unsubstituted tetravalent $C_6$-$C_{30}$ aromatic cyclic group, or a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone, fused to each other to form a condensed ring, or bonded by a bonding group selected from —O—, —S—, —C(=O)—, and —S(=O)$_2$—.

G in the above Formula 2 may be selected from the groups represented by the following Formulae 2-1a to 2-9a, but it is not limited thereto.

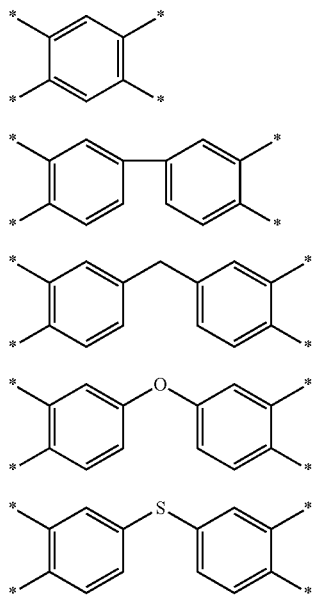

2-1a 2-2a 2-3a 2-4a 2-5a

-continued

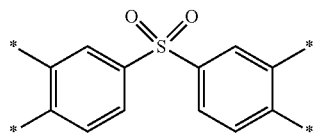

2-6a

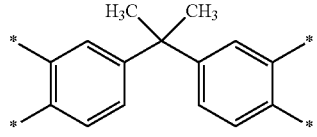

2-7a

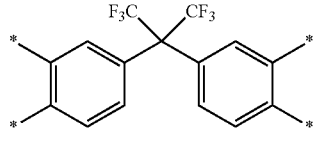

2-8a

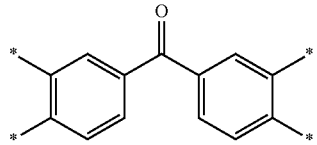

2-9a

For example, G in Formula 2 may be the group represented by the above Formula 2-2a, the group represented by the above Formula 2-8a, or the group represented by the above Formula 2-9a.

For example, the dianhydride compound may comprise 2,2'-bis-(3,4-dicarboxyphenyl)hexafluoropropane dianhydride (6-FDA) represented by the following formula, but it is not limited thereto.

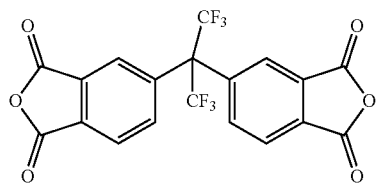

6-FDA

The diamine compound and the dianhydride compound may be polymerized to form an amic acid group.

Subsequently, the amic acid group may be converted to an imide group through a dehydration reaction. In such a case, a polyamide-imide-based polymer comprising a polyimide segment and a polyamide segment may be formed.

The polyimide segment may form a repeat unit represented by the following Formula A.

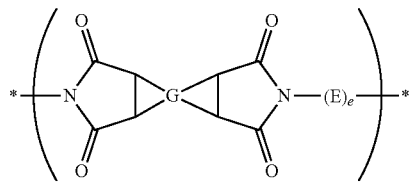

[Formula A]

In Formula A, E, G, and e are as described above.

For example, the polyimide segment may comprise a repeat unit represented by the following Formula A-1, but it is not limited thereto.

[Formula A-1]

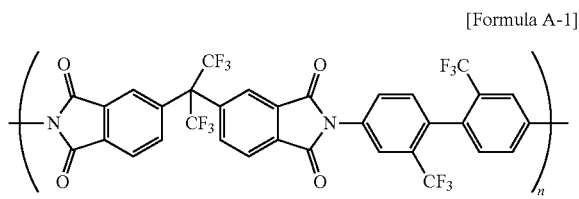

In Formula A-1, n may be an integer of 1 to 400.

In some embodiments, the polyamide-based polymer may comprise an amide-based repeat unit and an imide-based repeat unit at a molar ratio of 100:0 to 90:0. In such a case, mechanical properties such as flexibility and mechanical strength and optical properties such as transparency, transmittance, and haze of the polyamide-based film may be improved together.

Preferably, the polyamide-based polymer may not comprise an imide-based repeat unit. In such a case, the light resistance index and/or the light resistance color change index can be effectively adjusted to the above ranges. As a result, the light resistance of the polyamide-based film may be enhanced.

In some embodiments, the polyamide-based film may comprise a blue pigment. The blue pigment may comprise OP-1300A manufactured by Toyo, but it is not limited thereto.

In some embodiments, the blue pigment may be employed in an amount of 50 to 5,000 ppm based on the total weight of the polyamide-based polymer. In such a case, the yellow index before and after the light resistance test of the film may be decreased. Preferably, the blue pigment may be employed in an amount of 100 to 5,000 ppm, 200 to 5,000 ppm, 300 to 5,000 ppm, 400 to 5,000 ppm, 50 to 3,000 ppm, 100 to 3,000 ppm, 200 to 3,000 ppm, 300 to 3,000 ppm, 400 to 3,000 ppm, 50 to 2,000 ppm, 100 to 2,000 ppm, 200 to 2,000 ppm, 300 to 2,000 ppm, 400 to 2,000 ppm, 50 to 1,000 ppm, 100 to 1,000 ppm, 200 to 1,000 ppm, 300 to 1,000 ppm, or 400 to 1,000 ppm, based on the total weight of the polyamide-based polymer.

In some embodiments, the polyamide-based film may further comprise a UVA absorber. The UVA absorber may comprise an absorber that absorbs electromagnetic waves of a wavelength of 10 to 400 nm used in the art. For example, the UVA absorber may comprise a benzotriazole-based compound. The benzotriazole-based compound may comprise an N-phenolic benzotriazole-based compound. In some embodiments, the N-phenolic benzotriazole-based compound may comprise N-phenolic benzotriazole in which the phenol group is substituted with an alkyl group having 1 to 10 carbon atoms. It may be substituted with two or more of the alkyl group, which may be linear, branched, or cyclic.

In some embodiments, the UVA absorber may be employed in an amount of 0.1 to 10% by weight based on the total weight of the polyamide-based polymer. In such a case, the light resistance of the film can be enhanced. Preferably, the UVA absorber may be employed in an amount of 0.1 to 5% by weight, 0.1 to 3% by weight, 0.1 to 2% by weight, 0.5 to 10% by weight, 0.5 to 5% by weight, 0.5 to 3% by weight, 0.5 to 2% by weight, 1 to 10% by weight, 1 to 5% by weight, 1 to 3% by weight, or 1 to 2% by weight, relative to the total weight of the polyamide-based polymer.

In some embodiments, the polyamide-based film may comprise a blue pigment and a UVA absorber together. In such a case, the yellow index of the film may be reduced, the transparency thereof may be enhanced, and the rate of increase in yellow index and the color difference upon the light resistance test may be reduced.

In some embodiments, the polyamide-based film may have a thickness deviation of 4 μm or less based on a thickness of 50 μm. The thickness deviation may refer to a deviation between the maximum or minimum value with respect to the average of thicknesses measured at 10 random points of the film. In such a case, as the polyamide-based film has a uniform thickness, its optical properties and mechanical properties at each point may be uniformly exhibited.

The polyamide-based film may have a haze of 1% or less. For example, the haze may be 0.7% or less or 0.5% or less, but it is not limited thereto.

The polyamide-based film may have a transmittance of 80% or more. For example, the transmittance may be 82% or more, 85% or more, 88% or more, 89% or more, 80% to 99%, 88% to 99%, or 89% to 99%, but it is not limited thereto.

The polyamide-based film may have a yellow index of 3 or less. For example, the yellow index may be 2.8 or less or 2.5 or less, but it is not limited thereto.

The polyamide-based film may have a modulus (Y) of 4 GPa or more. Specifically, the modulus may be 5 GPa or more, 6 GPa or more, 6.3 GPa or more, or 6.5 GPa or more, but it is not limited thereto.

The polyamide-based film may have a compressive strength of 0.4 kgf/μm or more. Specifically, the compressive strength may be 0.45 kgf/μm or more, or 0.46 kgf/μm or more, but it is not limited thereto.

When the polyamide-based film is perforated at a speed of 10 mm/min using a 2.5-mm spherical tip in a UTM compression mode, the maximum diameter (mm) of perforation including a crack is 60 mm or less. Specifically, the maximum diameter of perforation may be 5 to 60 mm, 10 to 60 mm, 15 to 60 mm, 20 to 60 mm, 25 to 60 mm, or 25 to 58 mm, but it is not limited thereto.

The polyamide-based film may have a surface hardness of HB or higher. Specifically, the surface hardness may be H or higher, or 2H or higher, but it is not limited thereto.

The polyamide-based film may have a tensile strength of 15 kgf/mm$^2$ or more. Specifically, the tensile strength may be 18 kgf/mm$^2$ or more, 20 kgf/mm$^2$ or more, 21 kgf/mm$^2$ or more, or 22 kgf/mm$^2$ or more, but it is not limited thereto.

The polyamide-based film may have an elongation of 15% or more. Specifically, the elongation may be 16% or more, 17% or more, or 17.5% or more, but it is not limited thereto.

The polyamide-based film according to an embodiment may be enhanced in flexibility and transparency and suppressed in a change in transparency and color due to UV rays.

The physical properties of the polyamide-based film as described above are based on a thickness of 40 μm to 60 μm. For example, the physical properties of the polyamide-based film are based on a thickness of 50 μm.

The features on the components and properties of the polyamide-based film as described above may be combined with each other.

For example, the polyamide-based film comprises a polyamide-based polymer and may have a transmittance of 80% or more, a haze of 1% or less, and a yellow index of 3 or less.

In addition, the light resistance index and the light resistance color change index of the polyamide-based film as described above may be adjusted by combinations of the chemical and physical properties of the components, which constitute the polyamide-based film, along with the conditions in each step of the process for preparing the polyamide-based film as described below.

For example, the compositions and contents of the components that constitute the polyamide-based film, the polymerization conditions and thermal treatment conditions in the film preparation process, and the like are all combined to achieve the light resistance index and/or the light resistance color change index in desired ranges.

Cover Window for a Display Device

The cover window for a display device according to an embodiment comprises a polyamide-based film and a functional layer.

The polyamide-based film comprises a polyamide-based polymer, wherein the light resistance index represented by the above Equation 1 is 0.660 $GPa^{-1}$ or less.

Details on the polyamide-based film are as described above.

The cover window for a display device can be advantageously applied to a display device.

As the polyamide-based film has a light resistance index within the above range, it may have excellent optical and mechanical properties, and its light resistance to UV rays may be enhanced.

Display Device

The display device according to an embodiment comprises a display unit; and a cover window disposed on the display unit, wherein the cover window comprises a polyamide-based film and a functional layer.

The polyamide-based film comprises a polyamide-based polymer, wherein the light resistance index represented by the above Equation 1 is 0.660 $GPa^{-1}$ or less.

Details on the polyamide-based film and the cover window are as described above.

Figure 2:
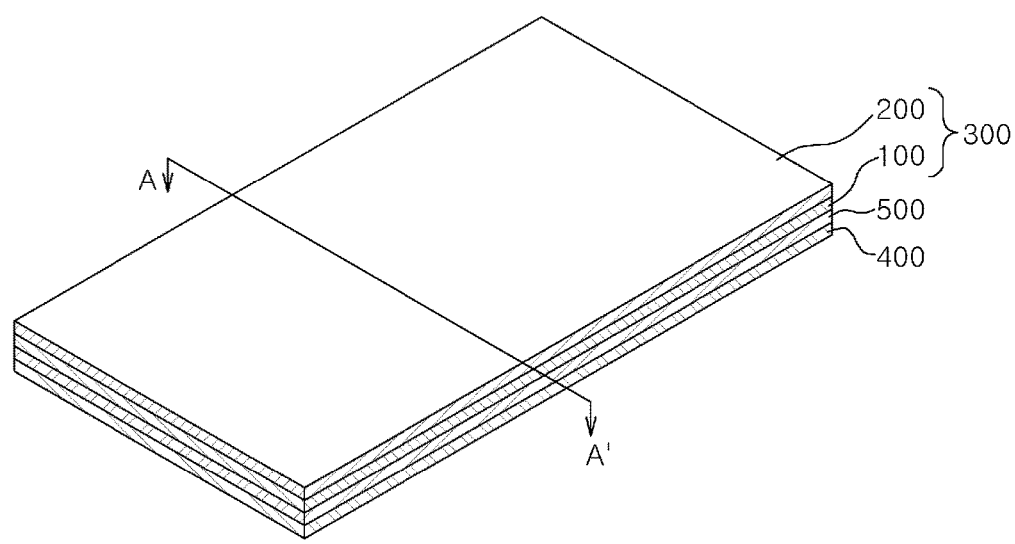
FIG. 2 is a schematic perspective view of a display device according to an embodiment.
Figure 3:
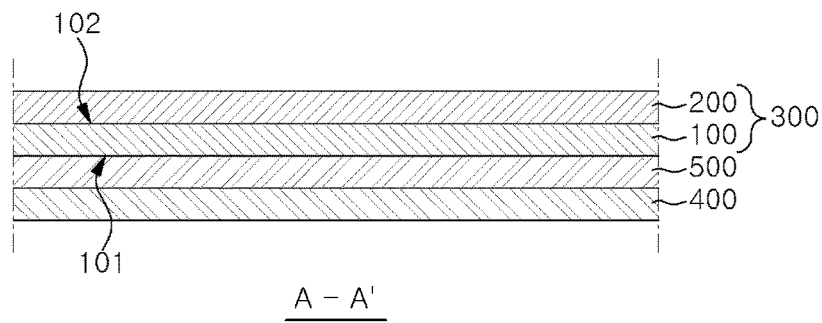
FIG. 3 is a schematic cross-sectional view of a display device according to an embodiment.

FIG. 1 is a schematic exploded view of a display device according to an embodiment. FIG. 2 is a schematic perspective view of a display device according to an embodiment. FIG. 3 is a schematic cross-sectional view of a display device according to an embodiment.

Specifically, FIGS. 1 to 3 illustrate a display device, which comprises a display unit (400) and a cover window (300) disposed on the display unit (400), wherein the cover window comprises a polyamide-based film (100) having a first side (101) and a second side (102) and a functional layer (200), and an adhesive layer (500) is interposed between the display unit (400) and the cover window (300).

The display unit (400) is for displaying an image, and it may have flexible characteristics.

The display unit (400) may be a display panel for displaying an image. For example, it may be a liquid crystal display panel or an organic electroluminescent display panel. The organic electroluminescent display panel may comprise a front polarizing plate and an organic EL panel.

The front polarizing plate may be disposed on the front side of the organic EL panel. Specifically, the front polarizing plate may be attached to the side on which an image is displayed in the organic EL panel.

The organic EL panel may display an image by self-emission of a pixel unit. The organic EL panel may comprise an organic EL substrate and a driving substrate. The organic EL substrate may comprise a plurality of organic electroluminescent units, each of which corresponds to a pixel. Specifically, it may comprise a cathode, an electron transport layer, a light-emitting layer, a hole transport layer, and an anode. The driving substrate is operatively coupled to the organic EL substrate. That is, the driving substrate may be coupled to the organic EL substrate so as to apply a driving signal such as a driving current, so that the driving substrate can drive the organic EL substrate by applying a current to the respective organic electroluminescent units.

In addition, an adhesive layer (500) may be interposed between the display unit (400) and the cover window (300). The adhesive layer may be an optically transparent adhesive layer, but it is not particularly limited.

The cover window (300) may be disposed on the display unit (400). The cover window is located at the outer position of the display device to thereby protect the display unit.

The cover window (300) may comprise a polyamide-based film and a functional layer. The functional layer may be at least one selected from the group consisting of a hard coating layer, a reflectance reducing layer, an antifouling layer, and an antiglare layer. The functional layer may be coated on at least one side of the polyamide-based film.

The polyamide-based film according to an embodiment can be applied in the form of a film to the outside of a display device without changing the display driving method, the color filter inside the panel, or the laminated structure, thereby providing a display device having a uniform thickness, low haze, high transmittance, and high transparency. Since neither significant process changes nor cost increases are needed, it is advantageous in that the production costs can be reduced.

The polyamide-based film according to an embodiment may be excellent in optical properties in terms of high transmittance, low haze, and low yellow index, as well as may have excellent mechanical properties such as modulus and flexibility, and the change (deterioration) of its optical and mechanical properties can be suppressed when it is exposed to UV rays Specifically, the polyamide-based film having a light resistance index and/or a light resistance color change index in the above ranges has excellent transparency, flexibility, and light resistance. Thus, its transparency and flexibility can be maintained for a long period of time even in an environment that can be strongly exposed to ultraviolet rays such as outdoors. Accordingly, it can be advantageously applied to an outdoor flexible display device, a portable flexible displace device, or the like.

Process for Preparing a Polyamide-Based Film

An embodiment provides a process for preparing a polyamide-based film.

The process for preparing a polyamide-based film according to an embodiment comprises polymerizing a diamine compound and a dicarbonyl compound to prepare a solution comprising a polyamide-based polymer in an organic solvent; casting the solution and then drying it to prepare a gel sheet; and thermally treating the gel sheet.

Figure 4:
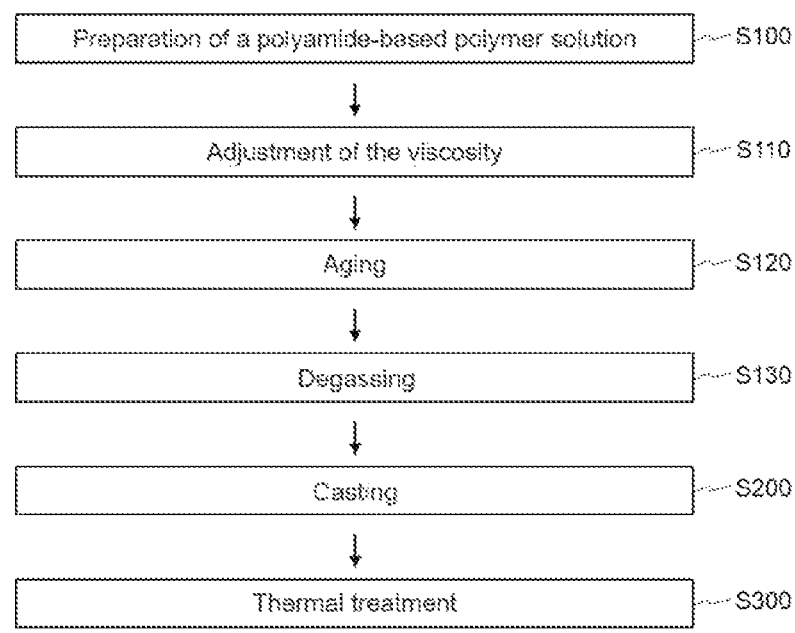
FIG. 4 is a schematic flow diagram of a process for preparing a polyamide-based film according to an embodiment.

Referring to FIG. 4, the process for preparing a polyamide-based film according to an embodiment comprises polymerizing a diamine compound and a dicarbonyl compound in an organic solvent to prepare a solution comprising a polyamide-based polymer (S100); casting the polymer solution to prepare a gel sheet (S200); and thermally treating the gel sheet (S300).

The process for preparing a polyamide-based film according to some embodiments may further comprise adjusting the viscosity of the polyamide-based polymer solution (S110), aging the polyamide-based polymer solution (S120), and/or degassing the polyamide-based polymer solution (S130).

The polyamide-based film is a film in which a polyamide-based polymer is a main component. The polyamide-based polymer is a resin that comprises an amide repeat unit as a structural unit. Optionally, the polyamide-based polymer may comprise an imide repeat unit.

In the process for preparing a polyamide-based film, the polymer solution for preparing a polyamide-based polymer may be prepared by simultaneously or sequentially mixing a diamine compound and a dicarbonyl compound in an organic solvent in a reactor, and reacting the mixture (S100).

In an embodiment, the step of preparing the polymer solution may comprise mixing and reacting the diamine compound and the dicarbonyl compound in a solvent to produce a polyamide (PA) solution. The polyamide solution is a solution that comprises a polymer having an amide repeat unit.

In an embodiment, the step of preparing the polymer solution may be carried out by using two kinds of dicarbonyl compounds different from each other as the dicarbonyl compound. In such a case, the two kinds of dicarbonyl compounds may be mixed and reacted simultaneously or sequentially. Preferably, the first dicarbonyl compound and the diamine compound may react to form a prepolymer, and the prepolymer and the second dicarbonyl compound may react to form the polyamide-based polymer. In such a case, the light resistance index and/or the light resistance color change index of the polyamide-based polymer may be readily adjusted.

Details on the diamine compound and the dicarbonyl compound are as described above.

In an embodiment, the process may further comprise adjusting the viscosity of the polymer solution (S110) after the step of preparing the polymer solution. The viscosity of the polymer solution may be 200,000 cps to 350,000 cps at room temperature. In such an event, the film-forming capability of a polyamide-based film can be enhanced, thereby enhancing the thickness uniformity.

Specifically, the step of preparing the polymer solution may comprise simultaneously or sequentially mixing and reacting a diamine compound and a dicarbonyl compound in an organic solvent to prepare a first polymer solution; and further adding the dicarbonyl compound to prepare a second polymer solution having the target viscosity.

In the steps of preparing the first polymer solution and the second polymer solution, the stirring speeds may be different from each other. For example, the stirring speed when the first polymer solution is prepared may be faster than the stirring speed when the second polymer solution is prepared.

In some embodiment, when the first polymer solution is prepared, the first dicarbonyl compound and the second dicarbonyl compound may be sequentially reacted with the diamine compound. In such an event, a first polymer solution having a viscosity of 1,000 to 10,000 cps may be formed. Preferably, the viscosity of the first polymer solution may be 1,000 to 8,000 cps, 1,000 to 5,000 cps, 2,000 to 10,000 cps, 2,000 to 8,000 cps, 2,000 to 5,000 cps, 3,000 to 10,000 cps, 3,000 to 8,000 cps, or 3,000 to 5,000 cps.

In some embodiments, the second dicarbonyl compound may be further reacted with the first polymer solution to form a second polymer solution having a viscosity of 200,000 to 350,000 cps. For example, the step of further reacting the second dicarbonyl compound may serve as the step of viscosity adjustment.

As the viscosity of the polyamide-based polymer solution is adjusted through the first polymer solution and the second polymer solution, the light resistance index and the light resistance color change index in desired ranges can be effectively achieved.

For example, the viscosity of the polymer solution, light resistance index, and light resistance color change index may be adjusted by controlling the sequence and amounts of the first dicarbonyl compound and the second dicarbonyl compound added.

The molar ratio of the first dicarbonyl compound to the second dicarbonyl compound for the preparation of the polymer solution may be 21:79 to 79:21, preferably, 25:75 to 75:25, 30:70 to 75:25, 30:70 to 70:30, 35:65 to 75:25, or 40:60 to 75:25.

As the first dicarbonyl compound and the second dicarbonyl compound are used at such a ratio, it is possible to prepare a polyamide-based polymer having a light resistance index and/or a light resistance color change index within the above ranges and to improve the modulus, haze, transmittance, yellow index, light resistance, and the like of the polyamide-based film.

In some embodiments, when the polymer solution (first polymer solution) is formed, a dianhydride compound is reacted with a diamine compound to form a polyamic acid or a polyimide. Then, the polyamic acid or polyimide may be reacted with a dicarbonyl compound to form a polymer solution comprising a polyamide-imide. In such an event, the dianhydride compound as described above may be used. Its amount used may be 1 to 10% by mole, 1 to 3% by mole, or 1 to 5% by mole, based on the total amount of the dicarbonyl compound and the dianhydride compound. In such a case, the viscosities of the polymer solution, the first polymer solution, and the second polymer solution can be adjusted to desired ranges, and a polyamide-based film having a light resistance index and/or a light resistance color change index in the desired ranges can be prepared. In some embodiments, the dianhydride compound may not be used in the formation of the polymer solution. In such a case, a polyamide-based polymer that does not comprise the imide repeat unit may be formed.

In an embodiment, the mixing and reaction of the solvent, the diamine compound, and the dicarbonyl compound may be carried out at a temperature of −20 to 25° C. If it is outside the above temperature range, excessively few or many polymerization nuclei are formed, thereby making it difficult to form a polyamide-based polymer having a light resistance index and a light resistance color change index in the desired ranges. Thus, the mechanical properties and optical properties of the polyamide-based film may be deteriorated. In addition, the viscosity of the polymer solution may be less than a predetermined range. Preferably, the reaction of the diamine compound and the dicarbonyl compound may be carried out at a temperature of −20 to 20° C., −20 to 15° C., −20 to 10° C., −15 to 20° C., −15 to 15° C., −15 to 10° C., −10 to 20° C., −10 to 15° C., −10 to 10° C., −8 to 20° C., −8 to 15° C., −8 to 10° C., −5 to 20° C., −5 to 15° C., or −5 to 10° C.

In an embodiment, the mixing and reaction of the diamine compound and the dianhydride compound may be carried out at a temperature of 0 to 50° C. If it is outside the above temperature range, excessively few or many polymerization nuclei are formed, thereby making it difficult to form a polyamide-based polymer having a light resistance index and a light resistance color change index in the desired ranges. Thus, the mechanical properties and optical properties of the polyamide-based film may be deteriorated. In addition, the viscosity of the polymer solution may be less than a predetermined range. Preferably, the mixing and reaction of the diamine compound and the dianhydride compound may be carried out at a temperature of 0 to 45° C., 0 to 40° C., 10 to 50° C., 10 to 45° C., 10 to 40° C., 20 to 50° C., 20 to 45° C., or 20 to 40° C.

The content of solids contained in the polymer solution may be 10% by weight to 30% by weight, but it is not limited thereto.

If the content of solids contained in the polymer solution is within the above range, a polyamide-based film can be effectively produced in the casting step. In addition, the polyamide-based film thus produced may have enhanced mechanical properties and optical properties.

In still another embodiment, the step of preparing the polymer solution may further comprise adjusting the pH of the polymer solution. In this step, the pH of the polymer solution may be adjusted to 4 to 7, for example, 4.5 to 7.

The pH of the polymer solution may be adjusted by adding a pH adjusting agent. The pH adjusting agent is not particularly limited and may include, for example, amine-based compounds such as alkoxyamine, alkylamine, and alkanolamine.

As the pH of the polymer solution is adjusted to the above range, it is possible to prevent the occurrence of defects in the film produced from the polymer solution and to achieve the desired optical properties and mechanical properties in terms of yellow index and modulus.

The pH adjusting agent may be employed in an amount of 0.1% by mole to 10% by mole based on the total number of moles of monomers in the polymer solution.

In an embodiment, the organic solvent may be at least one selected from the group consisting of dimethylformamide (DMF), dimethylacetamide (DMAc), N-methyl-2-pyrrolidone (NMP), m-cresol, tetrahydrofuran (THF), and chloroform. The organic solvent employed in the polymer solution may be dimethylacetamide (DMAc), but it is not limited thereto.

In some embodiments, at least one of a blue pigment and a UVA absorber may be added to the polymer solution. The types and contents of the blue pigment and the UVA absorber are as described above. The blue pigment and the UVA absorber may be mixed with the polyamide-based polymer in the polymer solution.

The polymer solution may be stored at −20° C. to 20° C., −20° C. to 10° C., −20° C. to 5° C., −20° C. to 0° C., or 0° C. to 10° C.

If it is stored at the above temperature, it is possible to prevent degradation of the polymer solution and to lower the moisture content to thereby prevent defects of a film produced therefrom.

In some embodiments, the polymer solution or the polymer solution whose viscosity has been adjusted may be aged (S120).

The aging may be carried out by leaving the polymer solution at a temperature of −10 to 10° C. for 24 hours or longer. In such an event, the polyamide-based polymer or unreacted materials contained in the polymer solution, for example, may complete the reaction or achieve chemical equilibrium, whereby the polymer solution may be homogenized. The mechanical properties and optical properties of a polyamide-based film formed therefrom may be substantially uniform over the entire area of the film Preferably, the aging may be carried out at a temperature of −5 to 10° C., −5 to 5° C., or −3 to 5° C.

In an embodiment, the process may further comprise degassing the polyamide-based polymer solution (S130).

The step of degassing may remove moisture in the polymer solution and reduce impurities, thereby increasing the reaction yield and imparting excellent surface appearance and mechanical properties to the film finally produced.

The degassing may comprise vacuum degassing or purging with an inert gas.

The vacuum degassing may be carried out for 30 minutes to 3 hours after depressurizing the internal pressure of the tank in which the polymer solution is contained to 0.1 bar to 0.7 bar. The vacuum degassing under these conditions may reduce bubbles in the polymer solution. As a result, it is possible to prevent surface defects of the film produced therefrom and to achieve excellent optical properties such as haze.

Specifically, the purging may be carried out by purging the tank with an inert gas at an internal pressure of 1 atm to 2 atm. The purging under these conditions may remove moisture in the polymer solution, reduce impurities to thereby increase the reaction yield, and achieve excellent optical properties such as haze and mechanical properties.

The inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

The vacuum degassing and the purging with an inert gas may be carried out in separate steps.

For example, the step of vacuum degassing may be carried out, followed by the step of purging with an inert gas, but it is not limited thereto.

The vacuum degassing and/or the purging with an inert gas may improve the physical properties of the surface of a polyamide-based film thus produced.

Once the solution comprising a polyamide-based polymer in an organic solvent has been prepared as described above, a filler may be added to the solution.

The filler has an average particle diameter of 60 nm to 180 nm and a refractive index of 1.55 to 1.75. The content thereof is 100 ppm to 3,000 ppm based on the total weight of the solids content of the polyamide-based polymer. Details on the filler are as described above.

The polymer solution may be cast to prepare a gel sheet (S200).

For example, the polymer solution may be extruded, coated, and/or dried on a support to form a gel sheet.

In addition, the casting thickness of the polymer solution may be 200 μm to 700 μm. As the polymer solution is cast to a thickness within the above range, the final film produced after the drying and thermal treatment may have an appropriate and uniform thickness.

The polymer solution may have a viscosity of 200,000 cps to 350,000 cps at room temperature as described above. As the viscosity satisfies the above range, the polymer solution can be cast to a uniform thickness without defects, and a polyamide-based film having a substantially uniform thickness can be formed without local/partial thickness variations during drying. In addition, a film having a light resistance index and/or a light resistance color change index as described above can be produced.

The polymer solution thus cast is then dried at a temperature of 60° C. to 150° C. for 5 minutes to 60 minutes to prepare a gel sheet. Specifically, the polymer solution is dried at a temperature of 70° C. to 90° C. for 15 minutes to 40 minutes to prepare a gel sheet.

The solvent of the polymer solution may be partially or totally volatilized during the drying to prepare the gel sheet.

The dried gel sheet may be thermally treated to form a polyamide-based film (S300).

The thermal treatment of the gel sheet may be carried out, for example, through a thermosetting device.

The thermosetting device may thermally treat the gel sheet through hot air.

If the thermal treatment is carried out with hot air, the heat may be uniformly supplied. If the heat is not uniformly supplied, a satisfactory surface roughness cannot be achieved, which may raise or lower the surface energy too much.

The thermal treatment of the gel sheet may be carried out in a temperature range of 60° C. to 500° C. for 5 minutes to 200 minutes. Specifically, the thermal treatment of the gel sheet may be carried out in a temperature range of 80° C. to 300° C. at a temperature elevation rate of 1.5° C./minute to 20° C./minute for 10 minutes to 150 minutes.

In such an event, the initial temperature of the thermal treatment of the gel sheet may be 60° C. or higher. Specifically, the initial temperature of the thermal treatment of the gel sheet may be 80° C. to 180° C.

In addition, the maximum temperature in the thermal treatment may be 300° C. to 500° C. For example, the maximum temperature in the thermal treatment may be 350° C. to 500° C., 380° C. to 500° C., 400° C. to 500° C., 410° C. to 480° C., 410° C. to 470° C., or 410° C. to 450° C.

According to an embodiment, the thermal treatment of the gel sheet may be carried out in two or more steps.

Specifically, the thermal treatment may comprise a first hot air treatment step carried out for 5 minutes to 30 minutes in a range of 60° C. to 120° C.; and a second hot air treatment step carried out for 10 minutes to 120 minutes in a range of 120° C. to 350° C.

The thermal treatment under these conditions may cure the gel sheet to have appropriate surface hardness, modulus, and surface energy and may secure high light transmittance, low haze, and an appropriate level of glossiness of the cured film at the same time.

According to an embodiment, the thermal treatment may comprise passing it through an IR heater. The thermal treatment by an IR heater may be carried out for 1 minute to 30 minutes in a temperature range of 300° C. or higher. Specifically, the thermal treatment by an IR heater may be carried out for 1 minute to 20 minutes in a temperature range of 300° C. to 500° C.

The polyamide-based film is prepared by the preparation process as described above such that it may have a light resistance index and a light resistance color change index as described above and may be excellent in optical properties, mechanical properties, and light resistance.

The polyamide-based film can be applied to various uses that require flexibility, transparency, and a certain level of luminance. For example, the polyamide-based film can be applied to solar cells, displays, semiconductor devices, sensors, and the like.

In particular, since the polyamide-based film has excellent mechanical and optical properties and light resistance, it can be advantageously applied to a cover window for a display device and to a display device. Since it has excellent folding characteristics, it can be advantageously applied to a foldable display device or a flexible display device.

Details on the polyamide-based film prepared by the process for preparing a polyamide-based film are as described above.

EMBODIMENTS FOR CARRYING OUT THE INVENTION

Hereinafter, the present invention will be described in more detail with reference to the following examples. However, these examples are set forth to illustrate the present invention, and the scope of the present invention is not limited thereto.

Example 1

A 1-liter glass reactor equipped with a temperature-controllable double jacket was charged with 567 g of dimethylacetamide (DMAc) as an organic solvent at 10° C. under a nitrogen atmosphere. Then, 64.0 g (0.200 mole) of 2,2'-bis(trifluoromethyl)-4,4'-diaminobiphenyl (TFMB) as an aromatic diamine was slowly added thereto and dissolved.

Subsequently, 30.37 g (0.15 mole) of terephthaloyl chloride (TPC) was slowly added while the mixture was stirred for 1 hour. Then, 9.13 g (0.05 mole; 94% by mole of the total amount introduced) of isophthaloyl chloride (IPC) was added, followed by stirring the mixture for 1 hour, thereby preparing a first polymer solution. The viscosity of the first polymer solution was about 1,000 to 10,000 cps.

Then, 1 ml of an IPC solution having a concentration of 10% by weight in a DMAc solvent was added to the first polymer solution, followed by stirring the mixture for 30 minutes. This procedure was repeated, whereby a second polymer solution having a viscosity of about 250,000 cps was prepared. Here, about 12.18 g of the IPC solution was added. The amount of IPC added corresponded to the balanced amount of the number of moles of TPC and IPC added relative to the total number of moles of TFMB in the preparation of the first polymer solution.

The second polymer solution was coated onto a glass plate and then dried with hot air at 100° C. for 30 minutes. The dried polyamide polymer material was peeled off from the glass plate, fixed to a pin frame, and thermally treated in a temperature range of 80° C. to 300° C. at a temperature elevation rate of 2° C./minute to obtain a polyamide film having a thickness of 50 μm.

Examples 2 to 5 and Comparative Example

A polyamide film was prepared in the same manner as in Example 1, except that the content of the dicarbonyl compound was changed as shown in Tables 1 and 2 below.

In Comparative Examples 4 to 7, before TPC was added, BPDA and 6-FDA were added and reacted with TFMB. After BPDA and 6-FDA were reacted with TFMB at about 30° C., the reactor temperature was lowered to 10° C., and TPC was added.

In Examples 4 and 5 and Comparative Examples 5 and 7, a blue pigment (OP-1300A manufactured by Toyo Inc.) and/or a UVA absorber (Tinuvin 328 manufactured by BASF) were added to the second polymer solution. The blue pigment was added at 500 ppm, and the UVA absorber was added at 1.25% by weight, based on the total weight of the second polymer solution.

Evaluation Example

The films prepared in the Examples and Comparative Examples were each measured and evaluated for the following properties. The results are shown in Table 1 below.

Evaluation Example 1: Measurement of Modulus

A sample was cut out by at least 10 cm in the direction perpendicular to the main shrinkage direction of the film and by 10 cm in the main shrinkage direction. It was fixed by the clips disposed at an interval of 10 cm in a universal testing machine UTM 5566A of Instron. A stress-strain curve was obtained until the sample was fractured while it was stretched at a speed of 12.5 mm/minute at room temperature. The slope of the load with respect to the initial strain on the stress-strain curve was taken as the modulus (GPa).

Evaluation Example 2: Measurement of Transmittance and Haze

The light transmittance and haze were measured using a haze meter NDH-5000W manufactured by Nippon Denshoku Kogyo in accordance with the JIS K 7136 standard.

Evaluation Example 3: Measurement of Yellow Index

The yellow index (YI) was measured with a spectrophotometer (UltraScan PRO, Hunter Associates Laboratory) under the conditions of d65 and 10° in accordance with the ASTM-E313 standard.

Evaluation Example 4: Measurement of Color Index

The color index of the film was measured according to the CIE Lab color coordinates using UltraScan Pro of Hunter-Lab.

Evaluation Example 5: Evaluation of Light Resistance

The light resistance test cycle according to the following conditions was repeated 12 times using an Accelerated Weathering Tester (QUV/Spray, manufactured by Q-Lab). The yellow index and color index were measured again after the light resistance test. $\Delta YI$, $\Delta E$, $\Delta YI/Y$, and $\Delta YI/\Delta E$ were calculated and shown in Tables 1 and 2 below (Y: modulus). Here, $\Delta E$ was calculated according to the following Equation 3.

Light resistance test cycle: light having a wavelength of 340 nm was irradiated to a film sample at an intensity of 0.63 W/m² for 4 hours at 60° C. Then, the UV irradiation was stopped, and it was left at 50° C. for 4 hours while water was being sprayed thereto.

$$\Delta E = \sqrt{(L^* - L^*_0)^2 + (a^* - a^*_0)^2 + (b^* - b^*_0)^2} \quad \text{[Equation 3]}$$

In Equation 3, $L^*$, $a^*$, and $b^*$ are L, a, and b values according to the CIE Lab color coordinates after the light resistance test, respectively, and $L^*_0$, $a^*_0$, and $b^*_0$ are L, a, and b values according to the CIE Lab color coordinates before the light resistance test, respectively.

TABLE 1

|  |  | Ex. 1 | Ex. 2 | Ex. 3 | Ex. 4 | Ex. 5 |
| --- | --- | --- | --- | --- | --- | --- |
| Polymerization ratio of polyamide-based polymer | Diamine compound (molar ratio) | TFMB 100 | TFMB 100 | TFMB 100 | TFMB 100 | TFMB 100 |
|  | Dicarbonyl compound (molar ratio) | TPC 75 IPC 25 | TPC 70 IPC 30 |  | TPC 60 IPC 40 |  |
|  | Dianhydride compound (molar ratio) |  |  | — |  |  |
| Additive (content) |  |  | — |  | OP-1300A 500 ppm | OP-1300A 500 ppm, Tinuvin 328 1.25 wt % |
| Modulus (Y) (GPa) |  | 6.8 | 6.94 | 6.29 | 6.21 | 6.23 |
| Transmittance (%) |  | 88.9 | 89.0 | 89.0 | 88.6 | 89.2 |
| Hz |  | 0.4 | 0.4 | 0.3 | 0.6 | 0.3 |
| Before light resistance test | $YI_0$ | 2.78 | 2.72 | 2.45 | 1.07 | 1.62 |
|  | $L^*$ | 95.20 | 95.27 | 95.34 | 95.14 | 95.15 |
|  | $a^*$ | −0.15 | −0.11 | −0.11 | −0.28 | −0.45 |
|  | $b^*$ | 1.52 | 1.47 | 1.33 | 0.68 | 1.04 |
| After light resistance test | YI | 6.23 | 6.12 | 5.79 | 4.93 | 4.11 |
|  | $L^*$ | 95.52 | 95.57 | 95.67 | 95.33 | 95.32 |
|  | $a^*$ | −0.67 | −0.69 | −0.68 | −0.90 | −0.85 |
|  | $b^*$ | 3.58 | 3.53 | 3.35 | 2.97 | 2.52 |
| $\Delta YI$ (YI − $YI_0$) |  | 3.45 | 3.40 | 3.34 | 3.86 | 2.49 |
| $\Delta E$ |  | 2.15 | 2.16 | 2.12 | 2.38 | 1.54 |
| Light resistance index $\Delta YI/Y$ (GPa⁻¹) |  | 0.507 | 0.490 | 0.531 | 0.622 | 0.400 |
| Light resistance color change index $\Delta YI/\Delta E$ |  | 1.60 | 1.57 | 1.58 | 1.62 | 1.62 |

TABLE 2

|  |  | C. Ex. 1 | C. Ex. 2 | C. Ex. 3 | C. Ex. 4 | C. Ex. 5 | C. Ex. 6 | C. Ex. 7 |
|---|---|---|---|---|---|---|---|---|
| Polymerization ratio of polyamide-based polymer | Diamine compound (molar ratio) | TFMB 100 | TFMB 100 | TFMB 100 | TFMB 100 | TFMB 100 | TFMB 100 | TFMB1 00 |
|  | Dianhydride compound (molar ratio) | — | — | — |  | BPDA 3 |  | 6-FDA 7 |
|  | Dicarbonyl Compound (molar ratio) | TPC 95 IPC 5 | TPC 80 IPC 20 | TPC 5 IPC 95 |  | TPC 72 IPC 25 |  | TPC 71 IPC 22 |
| Additive (content) |  | — | — | — | OP-1300A 500 ppm, Tinuvin 328 1.25 wt % | — | OP-1300A 500 ppm, Tinuvin 328 1.25 wt % |
| Modulus (Y) (GPa) |  | 5.67 | 6.76 | 3.87 | 6.71 | 6.82 | 6.13 | 6.0 |
| Transmittance (%) |  | 76.9 | 85.4 | 89.3 | 88.8 | 89.1 | 89.5 | 89.0 |
| Hz (%) |  | 68.74 | 34 | 0.28 | 0.39 | 0.5 | 0.6 | 0.7 |
| Before light resistance test | $YI_0$ | 26.78 | 21.99 | 3.55 | 2.97 | 2.12 | 1.97 | 2.45 |
|  | L* | 83.92 | 89.94 | 95.47 | 95.24 | 95.01 | 95.50 | 95.11 |
|  | a* | 1.48 | 0.14 | −0.22 | −0.19 | −0.55 | −0.11 | −0.50 |
|  | b* | 12.81 | 10.94 | 1.96 | 1.64 | 1.33 | 1.09 | 1.50 |
| After light resistance test | YI | 35.39 | 28.97 | 6.33 | 7.54 | 6.64 | 7.74 | 6.97 |
|  | L* | 84.05 | 89.89 | 95.61 | 95.49 | 95.19 | 95.56 | 95.16 |
|  | a* | 0.60 | −0.78 | −0.75 | −0.95 | −1.18 | −0.89 | −1.05 |
|  | b* | 18.09 | 15.96 | 3.67 | 4.41 | 3.96 | 4.49 | 4.13 |
| $\Delta YI$ (YI − $YI_0$) |  | 8.61 | 6.98 | 2.78 | 4.57 | 4.52 | 5.77 | 4.52 |
| $\Delta E$ |  | 5.35 | 5.10 | 1.80 | 2.88 | 2.71 | 3.49 | 2.69 |
| Light resistance index $\Delta YI/Y$ ($GPa^{-1}$) |  | 1.519 | 1.033 | 0.718 | 0.681 | 0.663 | 0.941 | 0.753 |
| Light resistance color change index $\Delta YI/\Delta E$ |  | 1.61 | 1.37 | 1.54 | 1.59 | 1.67 | 1.65 | 1.68 |

Referring to Tables 1 and 2, the films of the Examples having a light resistance index adjusted to 0.660 $GPa^{-1}$ or less according to the embodiment had excellent modulus and superior light transmittance and haze to the Comparative Examples having a light resistance index falling outside the range of the embodiment. Further, they were reduced in the rate of change in yellow index and the color difference before and after the light resistance test, confirming that the deterioration in optical properties and the color change due to UV rays were effectively prevented.

EXPLANATION OF REFERENCE NUMERALS

100: polyamide-based film
101: first side
102: second side
200: functional layer
300: cover window
400: display unit
500: adhesive layer

The invention claimed is:

1. A polyamide-based film, which comprises a polyamide-based polymer and has a light resistance index of 0.400 to 0.660 $GPa^{-1}$ as represented by the following Equation 1, and has a light resistance color change index of 1.55 to 1.64 as represented by the following Equation 2:

Light resistance index=$\Delta YI/Y$ [Equation 1]

in Equation 1, Y is the modulus of the film, and $\Delta YI$ is the rate of change in yellow index (YI) of the film before and after a light resistance test in which UV rays are irradiated to the film at 60° C., the UV irradiation is stopped, and water is sprayed at 50° C., Light resistance color change index=$\Delta YI/\Delta E$ [Equation 2]

in Equation 2, $\Delta E$ is the color difference of the film before and after the light resistance test,
wherein the polyamide-based polymer is prepared by polymerizing a diamine compound and a dicarbonyl compound,
wherein the polyamide-based polymer comprises a first amide-based repeat unit derived from a first dicarbonyl compound and a second amide-based repeat unit derived from a second dicarbonyl compound,
wherein the angle between the two carbonyl groups contained in the first dicarbonyl compound is greater than the angle between the two carbonyl groups contained in the second dicarbonyl compound,
wherein the molar ratio of the repeat unit derived from the first dicarbonyl compound and the repeat unit derived from the second dicarbonyl compound is 21:79 to 79:21,
wherein the polyamide-based film comprises a blue pigment, and the blue pigment is employed in an amount of 100 to 2,000 ppm based on the total weight of the polyamide-based polymer, and
wherein $\Delta YI$ is 4.5 or less.

2. The polyamide-based film of claim 1, wherein Y is 4 or more.

3. The polyamide-based film of claim 1, which further comprises a UVA absorber mixed with the polyamide-based polymer and the blue pigment.

4. The polyamide-based film of claim 1, which, based on a thickness of the film of 50 μm, has a modulus of 6 GPa or more, a transmittance of 80% or more, and a haze of 1% or less.

5. A process for preparing the polyamide-based film of claim 1, which comprises:
polymerizing the diamine compound and the dicarbonyl compound in an organic solvent to prepare a solution comprising the polyamide-based polymer;

casting the solution to prepare a gel sheet; and
thermally treating the gel sheet,
wherein the step of polymerizing the diamine compound and the dicarbonyl compound comprises reacting the diamine compound and the dicarbonyl compound to form a first polymer solution having a viscosity of 1,000 to 10,000 cps, and reacting the first polymer solution with an additional amount of the dicarbonyl compound to form a second polymer solution having a viscosity of 200,000 to 350,000 cps.

6. The process for preparing the polyamide-based film according to claim 5, wherein, in the step of forming the first polymer solution, a first dicarbonyl compound and a second dicarbonyl compound are sequentially reacted with the diamine compound, and, in the step of forming the second polymer solution, the second dicarbonyl compound is further reacted.

7. A cover window, which comprises a polyamide-based film comprising a polyamide-based polymer and a functional layer, wherein the polyamide-based film has a light resistance index of 0.400 to 0.660 $\text{GPa}^{-1}$ as represented by the following Equation 1, and has a light resistance color change index of 1.55 to 1.64 as represented by the following Equation 2:

Light resistance index=$\Delta YI/Y$ [Equation 1]

In Equation 1, Y is the modulus of the film, and $\Delta YI$ is the rate of change in yellow index (YI) of the film before and after a light resistance test in which UV rays are irradiated to the film at 60° C., the UV irradiation is stopped, and water is sprayed at 50° C., Light resistance color change index=$\Delta YI/\Delta E$ [Equation 2]

in Equation 2, $\Delta E$ is the color difference of the film before and after the light resistance test,
wherein the polyamide-based polymer is prepared by polymerizing a diamine compound and a dicarbonyl compound,
wherein the polyamide-based polymer comprises a first amide-based repeat unit derived from a first dicarbonyl compound and a second amide-based repeat unit derived from a second dicarbonyl compound,
wherein the angle between the two carbonyl groups contained in the first dicarbonyl compound is greater than the angle between the two carbonyl groups contained in the second dicarbonyl compound,
wherein the molar ratio of the repeat unit derived from the first dicarbonyl compound and the repeat unit derived from the second dicarbonyl compound is 21:79 to 79:21, and wherein the polyamide-based film comprises a blue pigment, and the blue pigment is employed in an amount of 100 to 2,000 ppm based on the total weight of the polyamide-based polymer.

8. A display device, which comprises a display unit; and a cover window disposed on the display unit, wherein the cover window comprises a polyamide-based film comprising a polyamide-based polymer and a functional layer, and the polyamide-based film has a light resistance index of 0.400 to 0.660 $\text{GPa}^{-1}$ as represented by the following Equation 1, and has a light resistance color change index of 1.55 to 1.64 as represented by the following Equation 2:

Light resistance index=$\Delta YI/Y$ [Equation 1]

in Equation 1, Y is the modulus of the film, and $\Delta YI$ is the rate of change in yellow index (YI) of the film before and after a light resistance test in which UV rays are irradiated to the film at 60° C., the UV irradiation is stopped, and water is sprayed at 50° C., Light resistance color change index=$\Delta YI/\Delta E$ [Equation 2]

in Equation 2, $\Delta E$ is the color difference of the film before and after the light resistance test,
wherein the polyamide-based polymer is prepared by polymerizing a diamine compound and a dicarbonyl compound,
wherein the polyamide-based polymer comprises a first amide-based repeat unit derived from a first dicarbonyl compound and a second amide-based repeat unit derived from a second dicarbonyl compound,
wherein the angle between the two carbonyl groups contained in the first dicarbonyl compound is greater than the angle between the two carbonyl groups contained in the second dicarbonyl compound,
wherein the molar ratio of the repeat unit derived from the first dicarbonyl compound and the repeat unit derived from the second dicarbonyl compound is 21:79 to 79:21, and wherein the polyamide-based film comprises a blue pigment, and the blue pigment is employed in an amount of 100 to 2,000 ppm based on the total weight of the polyamide-based polymer.

* * * * *